United States Patent
Suga et al.

(10) Patent No.: US 12,319,785 B2
(45) Date of Patent: Jun. 3, 2025

(54) METHOD FOR PRODUCING AROMATIC POLYETHER, AND POTASSIUM CARBONATE USED IN SAME

(71) Applicant: IDEMITSU KOSAN CO., LTD., Tokyo (JP)

(72) Inventors: Koichi Suga, Sodegaura (JP); Minoru Senga, Sodegaura (JP); Hiromu Kumagai, Sodegaura (JP); Yuko Murakami, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/024,231

(22) PCT Filed: Sep. 2, 2021

(86) PCT No.: PCT/JP2021/032216
§ 371 (c)(1),
(2) Date: Mar. 1, 2023

(87) PCT Pub. No.: WO2022/050330
PCT Pub. Date: Mar. 10, 2022

(65) Prior Publication Data
US 2023/0265245 A1   Aug. 24, 2023

(30) Foreign Application Priority Data

Sep. 2, 2020  (JP) .................... 2020-147623

(51) Int. Cl.
*C08G 65/40* (2006.01)

(52) U.S. Cl.
CPC .................. *C08G 65/4087* (2013.01)

(58) Field of Classification Search
CPC .................... C08G 65/4087; C08G 65/40
See application file for complete search history.

(56) References Cited

U.S. PATENT DOCUMENTS

| | | |
|---|---|---|
| 4,176,222 A | 11/1979 | Cinderey et al. |
| 4,952,665 A | 8/1990 | Ebata et al. |
| 4,959,423 A * | 9/1990 | Harris ............. C08L 71/00 525/534 |
| 5,298,592 A * | 3/1994 | Aumueller ........ C08G 75/23 528/125 |
| 2011/0201775 A1 | 8/2011 | Louis et al. |
| 2011/0213095 A1 | 9/2011 | Louis |
| 2011/0213115 A1 | 9/2011 | Louis |
| 2011/0224399 A1 | 9/2011 | Louis et al. |
| 2014/0221595 A1 | 8/2014 | Louis et al. |
| 2015/0344418 A1 | 12/2015 | Louis et al. |
| 2016/0145385 A1 | 5/2016 | Louis |
| 2016/0145386 A1 | 5/2016 | Louis |
| 2020/0024393 A1 | 1/2020 | Allcock et al. |

FOREIGN PATENT DOCUMENTS

| | | |
|---|---|---|
| DE | 41 21 139 A1 | 1/1993 |
| GB | 2 517 570 A | 2/2015 |
| JP | S56-103220 A | 8/1981 |
| JP | S59-093724 A | 5/1984 |
| JP | S60-133026 A | 7/1985 |
| JP | S62-148524 A | 7/1987 |
| JP | S64-065129 A | 3/1989 |
| JP | H01-306427 A | 12/1989 |
| JP | H02-308814 A | 12/1990 |
| JP | H05-339362 A | 12/1993 |
| JP | H06-032894 A | 2/1994 |
| JP | H06-032895 A | 2/1994 |
| JP | 2010-018763 A | 1/2010 |
| JP | 2010-229264 A | 10/2010 |
| JP | 2011-093965 A | 5/2011 |
| JP | 2012-506474 A | 3/2012 |
| JP | 2013-500350 A | 1/2013 |
| JP | 2015-110778 A | 6/2015 |
| JP | 2016-526598 A | 9/2016 |
| JP | 2018-135534 A | 8/2018 |
| JP | 2020-066662 A | 4/2020 |
| WO | WO-2019/186085 A1 | 10/2019 |

OTHER PUBLICATIONS

Fujifilm Wako Chemicals catalog, revised Jun. 26, 2020.*
International Search Report and Translation of International Preliminary Report on Patentability issued in connection with PCT Appl. Ser. No. PCT/JP2021/032216 dated Nov. 22, 2021.

* cited by examiner

*Primary Examiner* — Shane Fang
(74) *Attorney, Agent, or Firm* — Foley & Lardner LLP

(57) ABSTRACT

Provided is a method for producing an aromatic polyether, comprising reacting 4,4'-dichlorobenzophenone and hydroquinone in the presence of a potassium carbonate satisfying at least one of the following conditions (A) and (B): (A) the potassium carbonate has a bulk density of 1.2 g/ml or less; and (B) an average particle diameter D (μm) and a specific surface area S (m²/g) of the potassium carbonate satisfy D/S≤600.

6 Claims, No Drawings

METHOD FOR PRODUCING AROMATIC POLYETHER, AND POTASSIUM CARBONATE USED IN SAME

CROSS-REFERENCE TO RELATED APPLICATIONS

The present application claims priority under 35 U.S.C. § 371 to International Patent Application No. PCT/JP2021/032216, filed Sep. 2, 2021, which claims priority to and the benefit of Japanese Patent Application No. 2020-147623, filed on Sep. 2, 2020. The contents of these applications are hereby incorporated by reference in their entireties.

TECHNICAL FIELD

The present invention relates to a method for producing an aromatic polyether and a potassium carbonate to be used in the method.

BACKGROUND ART

An aromatic polyether such as a polyether ether ketone (PEEK) has been known as a representative resin of an engineering plastic.

A method based on a so-called aromatic nucleophilic substitution reaction, the method comprising causing an aromatic halogen compound having an electron-withdrawing group and a phenol to react with each other in the presence of an alkali metal salt, has been known as a method for producing the aromatic polyether, and a method comprising using specific reaction materials in combination has been known.

In each of, for example, Patent Literatures 1 and 2, there is a disclosure of a method comprising causing 4,4'-difluorobenzophenone and a phenol such as p-hydroquinone to react with each other in the presence of an alkali metal salt satisfying a specific condition concerning a particle size distribution or the like (specifically, sodium carbonate or potassium carbonate).

In addition, in Patent Literature 3, there is a disclosure of a method comprising subjecting an aromatic dihydroxy compound and an aromatic dichloro compound to polycondensation while the following condition is regarded as essential: the polycondensation is performed in the presence of an alkali metal carbonate and an alkali metal fluoride.

CITATION LIST

Patent Literature

[0006][PTL 1] JP 2015-110778 A
[PTL 2] JP 2018-135534 A
[PTL 3] JP S64-65129 A

SUMMARY OF INVENTION

Technical Problem

The related art typified by Patent Literatures 1 to 3 has been found to be susceptible to further improvement from the viewpoint of the production of a high-molecular weight aromatic polyether through use of an aromatic chlorine compound.

An object of the present invention is to provide a method for producing an aromatic polyether using an aromatic chlorine compound to produce an aromatic polyether having a high molecular weight.

DESCRIPTION OF EMBODIMENTS

According to the present invention, there are provided the following aromatic polyether and the like. 1. A method for producing an aromatic polyether, comprising reacting 4,4'-dichlorobenzophenone and hydroquinone in the presence of a potassium carbonate satisfying at least one of the following conditions (A) and (B):
(A) the potassium carbonate has a bulk density of 1.2 g/ml or less; and
(B) an average particle diameter D ($\mu$m) and a specific surface area S ($m^2$/g) of the potassium carbonate satisfy D/S≤600.
2. The method for producing an aromatic polyether according to 1, wherein the potassium carbonate satisfies the condition (A).
3. The method for producing an aromatic polyether according to 1 or 2, wherein the potassium carbonate satisfies the condition (B).
4. The method for producing an aromatic polyether according to any one of 1 to 3, comprising reacting 4,4'-dichlorobenzophenone and hydroquinone under a condition in which none of sodium fluoride, potassium fluoride, rubidium fluoride and cesium fluoride are present.
5. The method for producing an aromatic polyether according to any one of 1 to 4, wherein the aromatic polyether to be produced has a melt flow index of 100 g/10 min or less.
6. A potassium carbonate to be used for producing an aromatic polyether by reacting 4,4'-dichlorobenzophenone and hydroquinone, which satisfies at least one of the following conditions (A) and (B):
(A) the potassium carbonate has a bulk density of 1.2 g/ml or less; and
(B) an average particle diameter D ($\mu$m) and a specific surface area S ($m^2$/g) of the potassium carbonate satisfy D/S≤600.

According to the present invention, the method for producing an aromatic polyether using an aromatic chlorine compound to produce an aromatic polyether having a high molecular weight, and the potassium carbonate to be used in the method can be provided.

DESCRIPTION OF EMBODIMENTS

Embodiments of the present invention are described below.

The expression ""x" to "y"" as used herein represents the numerical range of "from "x" or more to "y" or less." An upper limit value and a lower limit value described for the numerical range may be arbitrarily combined.

In addition, two or more embodiments that are not contrary to each other out of the individual embodiments of an aspect according to the present invention to be described below may be combined, and an embodiment in which the two or more embodiments are combined is also an embodiment of the aspect according to the present invention.
(Method for Producing Aromatic Polyether)

A method for producing an aromatic polyether according to one aspect of the present invention comprising reacting 4,4'-dichlorobenzophenone and hydroquinone in the presence of a potassium carbonate satisfying at least one of the following conditions (A) and (B):
(A) the potassium carbonate has a bulk density of 1.2 g/ml or less; and
(B) an average particle diameter D (μm) and a specific surface area S (m$^2$/g) of the potassium carbonate satisfy D/S≤600.

4,4'-Dichlorobenzophenone and hydroquinone are monomers for polymerizing the aromatic polyether.

Through a step of reacting 4,4'-dichlorobenzophenone and hydroquinone, the aromatic polyether can be obtained as a copolymer of these compounds (monomer units).

The method for producing an aromatic polyether according to one aspect of the present invention is specifically a method for producing a polyether ether ketone (PEEK), and the production method can specifically provide a polyether ether ketone (PEEK).

The term "reaction mixture" as used herein refers to a reaction system from the start of the reaction between 4,4'-dichlorobenzophenone and hydroquinone to the completion of the reaction, and preferably refers to the form of a solution containing a solvent to be described later in addition to these monomers.

The potassium carbonate is a component to be added into the solvent (reaction system) for accelerating the reaction between 4,4'-dichlorobenzophenone and hydroquinone.

Specifically, when 4,4'-dichlorobenzophenone and hydroquinone are caused to react with each other in the presence of the potassium carbonate in the solvent, it is conceivable that hydroquinone is deprotonated on the surface of the potassium carbonate or near the surface, and is substituted with potassium to produce potassium-substituted hydroquinone. The potassium-substituted hydroquinone undergoes a nucleophilic reaction with 4,4'-dichlorobenzophenone to produce an aromatic polyether such as a PEEK (aromatic nucleophilic substitution reaction). In the aromatic nucleophilic substitution reaction, the stage at which hydroquinone is substituted with potassium serves as the rate-determining step of the entirety of the reaction.

In the method for producing an aromatic polyether according to one embodiment of this aspect, when 4,4'-dichlorobenzophenone and hydroquinone are caused to react with each other in the presence of the potassium carbonate satisfying at least one of the above-mentioned condition (A) or (B), the deprotonation reaction of hydroquinone on the surface of the potassium carbonate or near the surface, and the substitution reaction thereof with potassium, which are each the rate-determining step of the aromatic nucleophilic substitution reaction, are assumed to advance smoothly. Thus, the ratio at which the nucleophilic reaction of the potassium-substituted hydroquinone with 4,4'-dichlorobenzophenone occurs is assumed to become higher to impart a high molecular weight to the aromatic polyether to be obtained.

The bulk density of the potassium carbonate to be used in the reaction between 4,4'-dichlorobenzophenone and hydroquinone (hereinafter simply referred to as "potassium carbonate") may be 1.2 g/ml or less, 1.1 g/ml or less, or 1.0 g/ml or less, and may be 0.05 g/ml or more, or 0.10 g/ml or more.

In addition, the bulk density of the potassium carbonate may be, for example, 0.05 g/ml to 1.2 g/ml, 0.05 g/ml to 1.1 g/ml, 0.05 g/ml to 1.0 g/ml, 0.10 g/ml to 1.2 g/ml, 0.10 g/ml to 1.1 g/ml, or 0.10 g/ml to 1.0 g/ml.

As the bulk density of the potassium carbonate becomes smaller, a higher molecular weight is obtained in the aromatic polyether to be obtained. As the bulk density of the potassium carbonate becomes larger, the potassium carbonate has a smaller volume, and hence becomes easier to handle.

The bulk density of the potassium carbonate is a value measured by a method described in Examples.

When the average particle diameter and specific surface area of the potassium carbonate are represented by D (μm) and S (m$^2$/g), respectively, the value of the ratio D/S may be 600 or less, 550 or less, or 500 or less, and may be 1 or more, 2 or more, or 5 or more.

In addition, the value of the ratio D/S may be, for example, 1 to 600, 1 to 550, 1 to 500, 2 to 600, 2 to 550, 2 to 500, 5 to 600, 5 to 550, or 5 to 500.

As the value of the ratio D/S becomes smaller, a higher molecular weight is obtained in the aromatic polyether to be obtained. As the value of the ratio D/S becomes larger, the potassium carbonate has a smaller volume, and hence becomes easier to handle.

The average particle diameter D (μm) and specific surface area S (m$^2$/g) of the potassium carbonate are values measured by methods described in Examples.

In one embodiment, the method for producing an aromatic polyether comprises reacting 4,4'-dichlorobenzophenone and hydroquinone in the presence of the potassium carbonate satisfying the condition (A).

In one embodiment, the method for producing an aromatic polyether comprises reacting 4,4'-dichlorobenzophenone and hydroquinone in the presence of the potassium carbonate satisfying the condition (B).

In one embodiment, the method for producing an aromatic polyether comprises reacting 4,4'-dichlorobenzophenone and hydroquinone in the presence of the potassium carbonate satisfying the condition (A) and satisfying the condition (B).

4,4'-Dichlorobenzophenone and hydroquinone can be easily synthesized, and commercial products are also available.

A molar ratio ([DCBP]:[HQ]) of 4,4'-dichlorobenzophenone (DCBP) and hydroquinone (HQ) to be subjected to the reaction is not particularly limited.

The molar ratio ([DCBP]:[HQ]) may be appropriately adjusted for the purpose of, for example, controlling the molecular weight of the aromatic polyether to be obtained.

In one embodiment, the molar ratio ([DCBP]:[HQ]) is 47.5:52.5 to 52.5:47.5, 48.0:52.0 to 52.0:48.0, 48.5:51.5 to 51.5:48.5, 49.0:51.0 to 51.0:49.0, or 49.5:50.5 to 50.5:49.5. Thereby, the molecular weight of the obtained aromatic polyether can be controlled so as to obtain fluidity suitable for molding.

The number of moles of 4,4'-dichlorobenzophenone (DCBP) may be larger than, smaller than, or identical to the number of moles of hydroquinone (HQ).

In one embodiment, 4,4'-dichlorobenzophenone and hydroquinone are reacted in a solvent.

The solvent is not particularly limited, and for example, a neutral polar solvent may be used. Examples of the neutral polar solvent include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethyl sulfoxide, diethyl sulfoxide, 1-methyl-1-oxosulfolane, 1-ethyl-1-oxosulfolane, 1-phenyl-1-oxosulfolane, N,N'-dimethylimidazolidinone and diphenyl sulfone.

In one embodiment, when 4,4'-dichlorobenzophenone and hydroquinone are reacted in a solvent containing an aromatic sulfone, the content of a solvent having a boiling point of 270° C. to 330° C. is 0 parts by mass or more and less than 1 part by mass with respect to 100 parts by mass of the aromatic sulfone in the reaction mixture.

When the content of the solvent having a boiling point of from 270° C. to 330° C. is set to 0 parts by mass or more and less than 1 part by mass with respect to 100 parts by mass of the aromatic sulfone, a high-molecular weight aromatic polyether can be produced at low cost.

The reaction mixture may contain one or two or more kinds of solvents. In particular, the reaction mixture preferably contains only one kind of solvent (single solvent) as a solvent. Thus, the process can be simplified.

The total concentration (on a blending amount basis) of 4,4'-dichlorobenzophenone and hydroquinone in the solvent is not particularly limited, and may be, for example, 1.0 mol/l or more, 1.4 mol/l or more, or 1.5 mol/l or more, and may be 6.0 mol/l or less, 5.0 mol/l or less, or 4.0 mol/l or less.

As the above-mentioned concentration becomes higher, the production amount of the aromatic polyether increases. As the concentration becomes lower, it becomes easier to suppress precipitation during polymerization.

The total concentration (on a blending amount basis) of 4,4'-dichlorobenzophenone and hydroquinone in the solvent is, for example, 1.0 mol/l to 6.0 mol/1, preferably 1.4 mol/l to 5.0 mol/1, more preferably 1.5 mol/l to 4.0 mol/1.

The concentration of the potassium carbonate in the solvent is not particularly limited.

In one embodiment, the blending amount of the potassium carbonate in the solvent is 100 parts by mol or more with respect to 100 parts by mol of hydroquinone to be blended into the solvent, and is 180 parts by mol or less, 160 parts by mol or less, 140 parts by mol or less, or 120 parts by mol or less with respect thereto.

The blending amount of the potassium carbonate in the solvent is, for example, 100 parts by mol to 180 parts by mol, preferably 100 parts by mol to 160 parts by mol, more preferably 100 parts by mol to 140 parts by mol, still more preferably 100 parts by mol to 120 parts by mol with respect to 100 parts by mol of hydroquinone to be blended into the solvent.

When the blending amount of the potassium carbonate is 100 parts by mol or more, a reaction time can be shortened. When the blending amount of the potassium carbonate is 180 parts by mol or less, the production of a gel component can be suppressed.

In the reaction between 4,4'-dichlorobenzophenone and hydroquinone, an alkali metal salt, such as any other alkali metal carbonate or an alkali metal hydrogen carbonate, may be present together with the above-mentioned potassium carbonate.

For example, sodium carbonate may be used in combination with the potassium carbonate.

Examples of the other alkali metal carbonate that may be used in combination with the potassium carbonate include lithium carbonate, rubidium carbonate and cesium carbonate.

Examples of the alkali metal hydrogen carbonate that may be used in combination with the potassium carbonate include lithium hydrogen carbonate, sodium hydrogen carbonate, potassium hydrogen carbonate, rubidium hydrogen carbonate and cesium hydrogen carbonate.

The alkali metal salts that may be used in combination with the potassium carbonate may be used alone or in combination thereof.

When any other alkali metal salt is used in combination with the potassium carbonate, the total concentration of the alkalis (including the potassium carbonate) in the solvent is not particularly limited.

In one embodiment, the total blending amount of the alkali metal salts in the solvent is 100 parts by mol or more with respect to 100 parts by mol of hydroquinone to be blended into the solvent, and is 180 parts by mol or less, 160 parts by mol or less, 140 parts by mol or less, or 120 parts by mol or less with respect thereto.

The total blending amount of the alkali metal salts in the solvent is, for example, from 100 parts by mol to 180 parts by mol, preferably 100 parts by mol to 160 parts by mol, more preferably 100 parts by mol to 140 parts by mol, still more preferably 100 parts by mol to 120 parts by mol with respect to 100 parts by mol of hydroquinone to be blended into the solvent.

When the total blending amount of the alkali metal salts is 100 parts by mol or more, the reaction time can be shortened. When the total blending amount of the alkali metal salts is 180 parts by mol or less, the production of the gel component can be suppressed.

4,4'-Dichlorobenzophenone and hydroquinone are preferably reacted under a condition in which none of sodium fluoride, potassium fluoride, rubidium fluoride and cesium fluoride are present.

In this aspect, even when none of those compounds is incorporated, a high-molecular weight aromatic polyether can be obtained. In addition, when 4,4'-dichlorobenzophenone and hydroquinone are reacted under such a condition in which none of sodium fluoride, potassium fluoride, rubidium fluoride and cesium fluoride are present, the remaining of these compounds in the aromatic polyether to be obtained can be avoided, and hence purification cost can be reduced.

The reaction between 4,4'-dichlorobenzophenone and hydroquinone can be performed under an inert gas atmosphere. The inert gas is not particularly limited, and examples thereof include nitrogen and an argon gas.

The reaction between 4,4'-dichlorobenzophenone and hydroquinone may be performed under heating. A reaction temperature may fall typically within the range of 150° C. to 380° C., preferably within the range of 180° C. to 350° C. In addition, the reaction time may be typically 0.1 hour to 10 hours, preferably 1 hour to 5 hours.

The reaction between 4,4'-dichlorobenzophenone and hydroquinone may be completed in one stage, or may be completed in two or more stages. When the reaction is performed in two or more stages, for example, the following may be performed: a part of all the monomers to be subjected to the reaction are reacted to provide a prepolymer, and then the remaining monomers are added to, and reacted with, the prepolymer.

In one embodiment, the temperature of the mixture of 4,4'-dichlorobenzophenone and hydroquinone is increased to 150° C. or more, and then the temperature is held.

In one embodiment, the temperature of the mixture of 4,4'-dichlorobenzophenone and hydroquinone is increased to 150° C. or more, and then the increase of the temperature and the holding of the temperature are repeated a plurality of times.

In each of the above-mentioned embodiments, the temperature increase after the temperature has been increased to 150° C. or more may be performed at a rate of 10° C./min or less. Thus, the rate-determining step in the reaction between 4,4'-dichlorobenzophenone and hydroquinone smoothly advances, and hence a high molecular weight is obtained in the aromatic polyether to be obtained.

The reaction between 4,4'-dichlorobenzophenone and hydroquinone may comprise, for example:

(i) a step of increasing the temperature of the mixture to a temperature of from 180° C. to 220° C., followed by the holding of the temperature for 0.5 hour to 2 hours at the temperature after the temperature increase;

(ii) a step of increasing the temperature to a temperature of from 230° C. to 270° C., followed by the holding of the temperature for 0.5 hour to 2 hours at the temperature after the temperature increase; and (iii) a step of increasing the temperature to a temperature of from 280° C. to 320° C., followed by the holding of the temperature for 1 hour to 8 hours at the temperature after the temperature increase.

The temperature increase in each of the steps (i) to (iii) may be performed at a rate of, for example, 10° C./min or less, 5° C./min or less, or 3° C./min or less. The temperature increase in each of the steps (i) to (iii) is preferably performed at, for example, 0.1° C./min to 10° C./min. Thus, the rate-determining step in the reaction between 4,4'-dichlorobenzophenone and hydroquinone smoothly advances, and hence a high molecular weight is obtained in the aromatic polyether to be obtained.

In one embodiment, the reaction between 4,4'-dichlorobenzophenone and hydroquinone may comprise at least one step selected from the group consisting of the step (i) to the step (iii) described above. When the reaction comprises two or three steps, the steps are preferably performed in order of increasing temperature. The reaction may comprise increasing the temperature of the reaction mixture between the two or three steps.

In one embodiment, the reaction between 4,4'-dichlorobenzophenone and hydroquinone is performed under a condition that the highest temperature of the reaction mixture is 280° C. to 320° C., more preferably more than 290° C. to 320° C.

The "highest temperature" of the reaction mixture as used herein is the highest temperature (highest temperature reached) reached by the reaction mixture during the start to the completion of the reaction between 4,4'-dichlorobenzophenone and hydroquinone.

After the completion of the reaction between 4,4'-dichlorobenzophenone and hydroquinone, the produced aromatic polyether may be separated, washed, or purified in accordance with a known method.

In one embodiment, no monomer other than 4,4'-dichlorobenzophenone and hydroquinone is used as a monomer to be subjected to the above-mentioned reaction.

In one embodiment, any monomer other than 4,4'-dichlorobenzophenone and hydroquinone is used in combination in the above-mentioned reaction to the extent that the effect of the present invention is not impaired.

In one embodiment, the total ratio (mass %) of 4,4'-dichlorobenzophenone and hydroquinone is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers to be subjected to the reaction.

In one embodiment, 70 mass % or more, 80 mass % or more, 90 mass % or more, 95 mass % or more, 99 mass % or more, 99.5 mass % or more, 99.9 mass % or more, or substantially 100 mass % of the reaction mixture at the time of the start of the reaction is formed of:

4,4'-dichlorobenzophenone, hydroquinone, the potassium carbonate, and the solvent; or 4,4'-dichlorobenzophenone, hydroquinone, the potassium carbonate, any alkali metal salt other than the potassium carbonate, and the solvent.

When "substantially 100 mass %" of the mixture is formed of those materials, the mixture may contain an inevitable impurity.

(Aromatic Polyether)

An aromatic polyether according to one aspect of the present invention comprises structural units (hereinafter also referred to as "repeating units") represented by the following formulae (1A) and (2A).

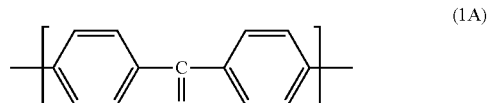

(1A)

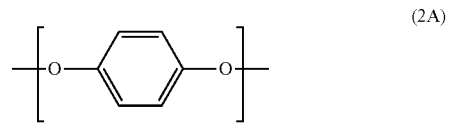

(2A)

In the aromatic polyether, a molar ratio ([1A]:[2A]) between the structural unit represented by the formula (1A) and the structural unit represented by the formula (2A) is not particularly limited.

In one embodiment, the molar ratio ([1A]:[2A]) is preferably 47.5:52.5 to 52.5:47.5, 48.0:52.0 to 52.0:48.0, 48.5:51.5 to 51.5:48.5, 49.0:51.0 to 51.0:49.0 or 49.5:50.5 to 50.5:49.5.

The number of moles of the structural unit represented by the formula (1A) may be larger than, smaller than, or identical to the number of moles of the structural unit represented by the formula (2A).

In the aromatic polyether according to one embodiment, the structural unit represented by the formula (2A) is linked to the structural unit represented by the formula (1A).

The aromatic polyether according to one embodiment comprises a structural unit represented by the following formula (3A).

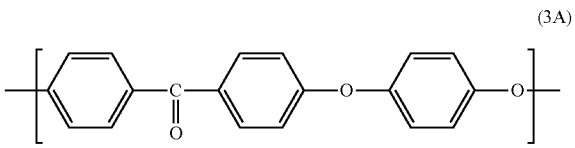

(3A)

The structural unit represented by the formula (3A) is a structural unit formed of a linked body of the structural unit represented by the formula (1A) and the structural unit represented by the formula (2A).

In the aromatic polyether according to one embodiment, the structural unit represented by the formula (1A) is arranged at each of one or more terminals of its molecular chain. In this case, a terminal structure bonded to the structural unit may be a chlorine atom (Cl).

In the aromatic polyether according to one embodiment, the structural unit represented by the formula (2A) is arranged at each of one or more terminals of its molecular chain. In this case, a terminal structure bonded to the structural unit may be, for example, a hydrogen atom (H) (when the terminal structure is the hydrogen atom (H), the atom may form a hydroxy group with an oxygen atom (O) in the structural unit).

The terminal structure of the aromatic polyether may be, for example, a structure obtained by substituting the above-mentioned chlorine atom (Cl) or hydroxy group with a hydrogen atom (H) or the like. The terminal structure is not limited to those examples, and may be any structure.

In one embodiment, the aromatic polyether is free of any structural unit other than the structural units represented by the formulae (1A) and (2A), provided that the aromatic polyether may have a terminal structure at a terminal of its molecular chain as described above.

In one embodiment, the aromatic polyether comprises any structural unit other than the structural units represented by the formulae (1A) and (2A) to the extent that the effect of the present invention is not impaired.

In one embodiment, the total ratio (mass %) of the structural units represented by the formulae (1A) and (2A) in all the monomers to be subjected to the reaction is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers.

In one embodiment, the melt flow index (abbreviation: "MI": identical in meaning to a melt flow rate (abbreviation: "MFR") described in ASTM D 1238-13) of the aromatic polyether is 100 g/10 min or less, 90 g/10 min or less, or 80 g/10 min or less, and is 1.0 g/10 min or more, 1.5 g/10 min or more, or 1.7 g/10 min or more.

Further, in one embodiment, the melt flow index of the aromatic polyether is preferably 1.0 g/10 min to 100 g/10 min, more preferably 1.0 g/10 min to 90 g/10 min, still more preferably 1.5 g/10 min to 90 g/10 min, still more preferably 1.0 g/10 min to 80 g/10 min, still more preferably 1.5 g/10 min to 80 g/10 min, most preferably 1.7 g/10 min to 80 g/10 min. As a result, the effect of setting the viscosity of the aromatic polyether to a range suitable for extrusion molding, injection molding, or the like can be obtained.

The melt flow index of the aromatic polyether is preferably 100 g/10 min or less. The aromatic polyether having a melt flow index of 100 g/10 min or less has a sufficiently high molecular weight, and hence pelletization with, for example, an extruder may be preferably applied thereto.

The melt flow index of the aromatic polyether is a value measured by a method described in Examples.

The melt flow index of the aromatic polyether can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

The melt flow index of the aromatic polyether may also be measured by the following measurement method, and even when the measurement is performed by the measurement method, a preferred range and the like are as described above.

The melt flow index of the aromatic polyether is measured with a melt indexer (L-220) manufactured by Tateyama Kagaku High-Technologies Co., Ltd. in conformity with JIS K 7210-1:2014 (ISO 1133-1:2011) under the following measurement conditions.

[Measurement Conditions]
  Measurement temperature (resin temperature): 380° C.
  Measurement load: 2.16 kg
  Cylinder inner diameter: 9.550 mm
  Die inner diameter: 2.095 mm
  Die length: 8.000 mm
  Piston head length: 6.35 mm
  Piston head diameter: 9.474 mm
  Piston weight: 110.0 g (The above-mentioned measurement load comprises the piston weight.)
  Operation:

The sample is dried at 150° C. for 2 hours or more in advance. The sample is loaded into the cylinder, and the piston is inserted thereinto, followed by preheating for 6 minutes. The load is applied to the cylinder, and a piston guide is removed, followed by the extrusion of a molten sample from the die. The sample is cut out when the piston moves by a distance in a predetermined range and a predetermined time ("t" [s]) passes after the start of the movement, and the weight of the sample is measured ("m" [g]). The MI thereof is determined from the following equation:
MI [g/10 min]=600/t×m.

In one embodiment, the intrinsic viscosity ninn of the aromatic polyether is 0.47 dl/g or more, 0.48 dl/g or more, 0.49 dl/g or more, or 0.50 dl/g or more, and is 2.00 dl/g or less, 1.80 dl/g or less, 1.50 dl/g or less, 1.30 dl/g or less, or 1.20 dl/g or less.

A suitable range of the intrinsic viscosity $\eta_{inh}$ of the aromatic polyether is, for example, 0.47 dl/g to 2.00 dl/g, 0.47 dl/g to 1.50 dl/g, 0.48 dl/g to 1.30 dl/g, or 0.50 dl/g to 1.20 dl/g. Thus, a molding material showing sufficient strength while securing appropriate melting fluidity at the time of its molding is obtained.

The intrinsic viscosity $\eta_{inh}$ of the aromatic polyether may be determined as described below.

The aromatic polyether is dried in a vacuum at 120° C. for 6 hours. Next, the aromatic polyether is dissolved in concentrated sulfuric acid (purity: 95 mass % or more), and a plurality of sample solutions in which the concentration C [g/dl] of the aromatic polyether is changed are obtained. After that, the flow time to [s] of the solvent (concentrated sulfuric acid (purity: 95 mass % or more)) and the flow time "t" [s] of the sample solution are measured in conformity with JIS K 7367-5:2000 (ISO 1628-5:1998) with a thermo-bath at 25° C. (thermostat for kinematic viscosity measurement (TV-5S manufactured by Thomas Kagaku Co., Ltd.)) and an Ubbelohde viscometer (No. 2), and a reduced viscosity ηsp/c is determined from the following equation: reduced viscosity $\eta_{sp}/c$ [dl/g]=(t-t$_0$)/(t$_0$×C).

A linear correlation equation is determined by performing two-dimensional plotting in which an axis of abscissa indicates the concentration C [g/dl] of each of the sample solutions and an axis of ordinate indicates the reduced viscosity $\eta_{sp}/c$. The value of the reduced viscosity $\eta_{sp}/c$ at a concentration of zero (intercept) can be determined as the intrinsic viscosity $\eta_{inh}$.

The intrinsic viscosity $\eta_{inh}$ of the aromatic polyether can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

In one embodiment, the reduced viscosity $\eta_{sp}/c$ of the aromatic polyether is 0.36 dl/g or more, more than 0.36 dl/g, 0.37 dl/g or more, 0.38 dl/g or more, 0.39 dl/g or more, 0.40 dl/g or more, 0.46 dl/g or more, or 0.48 dl/g or more, and is 1.50 dl/g or less, 1.30 dl/g or less, or 1.20 dl/g or less.

A suitable range of the reduced viscosity $\eta_{sp}/c$ of the aromatic polyether is, for example, 0.36 dl/g to 1.50 dl/g, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing sufficient strength while securing appropriate melting fluidity at the time of its molding is obtained.

The reduced viscosity $\eta_{sp}/c$ of the aromatic polyether is a value measured by a method described in Examples.

In the method described in Examples, the concentration of the aromatic polyether in a sulfuric acid solution (sample solution) for measurement is 0.1 g/dl.

The reduced viscosity $\eta_{sp}/c$ of the aromatic polyether can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture. The same holds true for the following reduced viscosity $\eta'_{sp}/c$.

The reduced viscosity $\eta_{sp}/c$ of the aromatic polyether may also be measured by the following measurement method, and even when the measurement is performed by the measurement method, a preferred range and the like are as described above.

The aromatic polyether is dried in a vacuum at 120° C. for 6 hours. Next, the aromatic polyether is dissolved in concentrated sulfuric acid (purity: 98 mass %), and a sample solution is prepared in a measuring flask so that the concentration C [g/dl] of the aromatic polyether may be 0.1 g/dl. Next, the flow time to [s] of the solvent (concentrated sulfuric acid (purity: 98 mass %)) and the flow time "t" [s] of the sample solution are measured in conformity with JIS K 7367-5:2000 (ISO 1628-5:1998) with a thermobath at 25° C. (thermostat for kinematic viscosity measurement (TV-5S manufactured by Thomas Kagaku Co., Ltd.)) and an Ubbelohde viscometer (No. 2), and the reduced viscosity $\eta_{sp}/c$ is determined from the following equation: reduced viscosity $\eta_{sp}/c$ [dl/g]=(t-t$_0$)/(t$_0$×C).

In one embodiment, the aromatic polyether to be produced has a reduced viscosity $\eta'_{sp}/c$ (not the reduced viscosity $\eta_{sp}/c$ measured by the method described in Examples), which is measured at 25° C. for a sulfuric acid solution (sample solution) obtained by dissolving the aromatic polyether in concentrated sulfuric acid at a concentration of 0.5 g/dl, of more than 0.36 dl/g, 0.37 dl/g or more, 0.38 dl/g or more, 0.39 dl/g or more, 0.40 dl/g or more, 0.46 dl/g or more, 0.48 dl/g or more, 0.50 dl/g or more, or 0.52 dl/g or more, and 1.50 dl/g or less, 1.30 dl/g or less, or 1.20 dl/g or less.

A suitable range of the reduced viscosity $\eta'_{sp}/c$ of the aromatic polyether is, for example, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing sufficient strength while securing appropriate melting fluidity at the time of its molding is obtained.

The reduced viscosity of the aromatic polyether tends to increase as the concentration of the aromatic polyether in the sample solution for measurement becomes higher. For example, when measurement is performed for the same aromatic polyether, the value of its reduced viscosity $\eta'_{sp}/c$ (aromatic polyether concentration: 0.5 g/dl) tends to be larger than the value of its reduced viscosity $\eta_{sp}/c$ (aromatic polyether concentration: 0.1 g/dl). For example, when the reduced viscosity $\eta_{sp}/c$ of the aromatic polyether is 0.36 dl/g, the reduced viscosity $\eta'_{sp}/c$ thereof is assumed to be larger than 0.36 dl/g.

In one embodiment, the crystallization temperature (Tc) of the aromatic polyether is 240° C. or more, and is 290° C. or less.

The crystallization temperature (Tc) of the aromatic polyether is a value measured through differential scanning calorimetry by the following procedure.

5 mg of the sample (aromatic polyether) is weighed in an aluminum-made pan, and is subjected to temperature scanning measurement with a differential scanning calorimeter (DSC). The measurement is performed in the following order: the temperature of the sample is increased from 20° C. to 420° C. at 20° C./min; the temperature thereof is decreased from 420° C. to 20° C. at −20° C./min; and the temperature thereof is increased from 20° C. to 420° C. at 20° C./min. The crystallization temperature (Tc) thereof is determined by reading the exothermic peak of the crystallization thereof observed during the temperature decrease out of the process. "DSC8500" manufactured by PerkinElmer Co., Ltd. is used in the measurement.

In one embodiment, the aromatic polyether contains a halogen atom. In one embodiment, the aromatic polyether contains a chlorine atom (Cl), and is substantially free of any fluorine atom (F). The contents of the chlorine atom (Cl) and fluorine atom (F) of the aromatic polyether may each be measured by a method described below (combustion ion chromatography). In this case, the contents of the chlorine atom (Cl) and the fluorine atom (F) comprise not only a chlorine atom (Cl) and a fluorine atom (F) for forming the molecular structure of the aromatic polyether but also a chlorine atom (Cl) and a fluorine atom (F) mixed into the aromatic polyether (e.g., a chlorine atom (Cl) and a fluorine atom (F) derived from the monomers, the atoms remaining in the aromatic polyether).

Contents of Chlorine Atom (Cl) and Fluorine Atom (F)

The contents of the chlorine atom (Cl) and fluorine atom (F) of the aromatic polyether are measured by combustion ion chromatography. The combustion ion chromatography comprises: introducing the sample into a combustion furnace; combusting the sample in a combustion gas containing oxygen; causing an absorbing liquid to collect a generated gas; and then subjecting the absorbing liquid to separation and quantification with an ion chromatograph. Quantitative values are each determined on the basis of a calibration curve produced from a reference having a known concentration. The quantitative values are each a value converted into a mole by setting the atomic weight of a chlorine atom (Cl) and the atomic weight of a fluorine atom (F) to 35.5 and 19.0, respectively. Measurement conditions are described below.

<Sample Combustion>
Combustion apparatus: AQF-2100H manufactured by Mitsubishi Chemical Analytech Co., Ltd.
Combustion furnace preset temperature: 800° C. on the front stage and 1,100° C. on the rear stage
Argon flow rate: 400 ml/min
Oxygen flow rate: 200 ml/min
Absorbing liquid: A hydrogen peroxide solution <Ion Chromatograph>
Analyzer: Integrion manufactured by Thermo Fisher Scientific, Inc.
Column: A guard column (Dionex IonPac AG12A) and a separation column (Dionex IonPac AS12A) are used while being linked to each other (both the columns are manufactured by DIONEX).
Eluent: $Na_2CO_3$ (2.7 mmol/l)+$NaHCO_3$ (0.3 mmol/l)
Flow rate: 1.5 ml/min Column temperature: 30° C.
Measurement mode: A suppressor system
Detector: An electric conductivity detector In one embodiment, (a) a fluorine atom content a in the aromatic polyether is less than 2 mg/kg. The lower limit of the content is not particularly limited, and may be, for example, 0 mg/kg.

Herein, the fluorine atom content a in the aromatic polyether is the sum of the content a1 of a fluorine atom incorporated into the molecular structure of the aromatic polyether and the content a2 of a fluorine atom, which is not incorporated into the molecular structure of the aromatic polyether, but is entrained as a free component. The amount of the fluorine atom for forming the free component serves as the fluorine atom content a2 in the aromatic polyether.

The phrase "the aromatic polyether is substantially free of any fluorine atom (F)" means that the fluorine atom content a of the aromatic polyether is less than 2 mg/kg.

In one embodiment, the fluorine atom content a in the aromatic polyether can be set to less than 2 mg/kg by refraining from the use of a fluorine atom-containing raw material (e.g., 4,4'-difluorobenzophenone) at the time of the synthesis of the aromatic polyether, or by reducing the usage amount of the fluorine atom-containing raw material at the time of the synthesis of the aromatic polyether.

In one embodiment, with regard to the fluorine atom content a2 in the aromatic polyether, the free component is one or both of potassium fluoride and 4,4'-difluorobenzophenone.

In one embodiment, (pi) a chlorine atom content b in the aromatic polyether is 2 mg/kg or more, 10 mg/kg or more, 100 mg/kg or more, 500 mg/kg or more, 700 mg/kg or more, 1,000 mg/kg or more, 2,000 mg/kg or more, 3,000 mg/kg or more, or 4,000 mg/kg or more.

The upper limit of the content is not particularly limited, and may be, for example, 10,000 mg/kg or less, 9,000 mg/kg or less, 8,000 mg/kg or less, 7,000 mg/kg or less, or 6,000 mg/kg or less.

The chlorine atom content b in the aromatic polyether is, for example, from 2 mg/kg to 10,000 mg/kg, preferably from 700 mg/kg to 9,000 mg/kg, more preferably from 1,000 mg/kg to 8,000 mg/kg.

Herein, the chlorine atom content b in the aromatic polyether is the sum of the content b1 of a chlorine atom incorporated into the molecular structure of the aromatic polyether and the content b2 of a chlorine atom, which is not incorporated into the molecular structure of the aromatic polyether, but is entrained as a free component. The amount of the chlorine atom for forming the free component serves as the chlorine atom content b2 in the aromatic polyether.

In one embodiment, the chlorine atom content b in the aromatic polyether can be set to 2 mg/kg or more by incorporating 4,4'-dichlorobenzophenone as a raw material at the time of the synthesis of the aromatic polyether. In addition, the chlorine atom content b in the aromatic polyether can be increased in the range of 2 mg/kg or more by using 4,4'-dichlorobenzophenone and hydroquinone as raw materials at the time of the synthesis of the aromatic polyether, and increasing the ratio of the usage amount of 4,4'-dichlorobenzophenone to the usage amount of hydroquinone.

The chlorine atom content b1 in the aromatic polyether is preferably 0 mg/kg or more and 10,000 mg/kg or less, more preferably 0 mg/kg or more and 9,000 mg/kg or less, still more preferably 0 mg/kg or more and 8,000 mg/kg or less.

When 4,4'-dichlorobenzophenone and hydroquinone are used as raw materials at the time of the synthesis of the aromatic polyether, and the ratio of the usage amount of 4,4'-dichlorobenzophenone to the usage amount of hydroquinone is reduced (e.g., the usage amount of 4,4'-dichlorobenzophenone is set to less than 100 parts by mol with respect to 100 parts by mol of hydroquinone), the chlorine atom content b1 in the aromatic polyether can be set to 0 mg/kg, or the content b1 can be set to a value close thereto.

The chlorine atom content b2 in the aromatic polyether is preferably 0 mg/kg or more and 500 mg/kg or less, more preferably 0 mg/kg or more and 400 mg/kg or less, still more preferably 0 mg/kg or more and 300 mg/kg or less.

In one embodiment, with regard to the chlorine atom content b2 in the aromatic polyether, the free component is one or both of potassium chloride and 4,4'-dichlorobenzophenone.

The amount of a chlorine atom entrained as potassium chloride, which is a free component, into the aromatic polyether is determined by the following method.

<Method of Measuring Amount of Chlorine Atom Entrained as Potassium Chloride, which is Free Component, into Aromatic Polyether>

A solid sample (aromatic polyether) is pulverized with a blender, and is washed with acetone and water in the stated order, followed by drying with an explosion-proof dryer at 180° C. When a reaction mixture (product) immediately after a reaction for the production of the aromatic polyether is used as a sample, the product is cooled and solidified after the completion of the reaction to be used as the solid sample. The blender to be used is not particularly limited, and for example, 7010 HS manufactured by Waring may be used.

About 1 g of the dried sample is weighed, and 100 ml of ultrapure water is added to the sample. The mixture is stirred at a liquid temperature of 50° C. for 20 minutes, and is left standing to cool. After that, the mixture is filtered to be separated into a solid content and an aqueous solution. The aqueous solution is analyzed by ion chromatography, and the amount of a chloride ion in the aqueous solution is determined on the basis of a calibration curve produced from a reference having a known concentration. Conditions for an ion chromatograph are as described below.

<Ion Chromatograph>
Analyzer: Metrohm 940 IC Vario
Column: A guard column (Metrosep A Supp 5 Guard) and a separation column (Metrosep A Supp 4) are used while being linked to each other (both the columns are manufactured by Metrohm AG).
Eluent: $Na_2CO_3$ (1.8 mmol/l)+$NaHCO_3$ (1.7 mmol/l)
Flow rate: 1.0 ml/min
Column temperature: 30° C.
Measurement mode: A suppressor system
Detector: An electric conductivity detector The amount of a chlorine atom entrained as 4,4'-dichlorobenzophenone, which is a free component, into the aromatic polyether is determined by the following method.

<Method of Measuring Amount of Chlorine Atom Entrained as 4,4'-Dichlorobenzophenone, which is Free Component, into Aromatic Polyether>

A solid sample (aromatic polyether) is pulverized with a blender, and is washed with acetone and water in the stated order, followed by drying with an explosion-proof dryer at 180° C. When a reaction mixture (product) immediately after a reaction for the production of the aromatic polyether is used as a sample, the product is cooled and solidified after the completion of the reaction to be used as the solid sample. The blender to be used is not particularly limited, but for example, 7010HS manufactured by Waring may be used.

About 1 g of the dried sample is weighed in a recovery flask, and 10 ml of acetone and a boiling stone are added thereto, followed by heating to reflux in a water bath for 5 hours. The mixture is left standing to cool to room temperature, and then its solid content is removed by filtration. The resultant acetone solution is evaporated to dryness with an evaporator, and then 10 ml of acetone is added with a volumetric pipette to redissolve the residue. The amount (mg/kg) of 4,4'-dichlorobenzophenone in the sample is calculated by subjecting the solution to measurement by gas chromatography. The amount (mg/kg) of the chlorine atom entrained as 4,4'-dichlorobenzophenone, which is a free component, into the aromatic polyether is converted from the following calculation equation.

Amount (mg/kg) of chlorine atom entrained as 4,4'-dichlorobenzophenone, which is free component, into aromatic polyether=amount (mg/kg) of 4,4'-dichlorobenzophenone in sample/251.11 (molecular weight of 4,4'-dichlorobenzophenone)×35.45 (atomic weight of chlorine)×2

The quantitative value of 4,4'-dichlorobenzophenone was determined on the basis of a calibration curve produced from a reference having a known concentration. Measurement conditions are described below.

<Gas Chromatograph>

Analyzer: Agilent Technologies 7890B

GC column: Agilent Technologies DB-5MS (length: 30 m, inner diameter: 0.25 mm, thickness: 0.25 μm)

Inlet temperature: 250° C.

Oven temperature: 100° C. (1 min)→30° C./min--250° C. (10 min)

Flow rate: 1 ml/min

Injection amount: 1 μl

Split ratio: 40:1

Detector: FID

Detector temperature: 250° C.

In one embodiment, the aromatic polyether satisfies the condition (α).

In one embodiment, the aromatic polyether satisfies the condition (β).

In one embodiment, the aromatic polyether satisfies the condition (α), and satisfies the condition (β).

(Applications)

For example, a pellet comprising the aromatic polyether according to this aspect may be produced by using the aromatic polyether. The pellet may be used as various molding materials requiring heat resistance, solvent resistance, an insulating property, and the like. A molded body may be produced through use of the pellet by a molding method such as injection molding with a mold. In addition, a molded body may be produced through use of the pellet by a molding method, such as extrusion molding, press molding, sheet molding, or film molding.

The applications of the aromatic polyether according to one aspect of the present invention are not particularly limited. The aromatic polyether is suitable in, for example, aerospace applications, sliding members, such as a gear and a bearing, and various resin compositions.

A molded body comprising the aromatic polyether according to this aspect is suitable as, for example, an aerospace molded body, a molded body for a sliding member, or a filament for a 3D printer. In addition, the molded body comprising the aromatic polyether is suitable as, for example, an aerospace injection-molded body or an injection-molded body for a sliding member.

(Potassium Carbonate)

A potassium carbonate according to one aspect of the present invention is a potassium carbonate to be used for producing an aromatic polyether by reacting 4,4'-dichlorobenzophenone and hydroquinone, which satisfies at least one of the following conditions (A) and (B):

(A) the potassium carbonate has a bulk density of 1.2 g/ml or less; and (B) an average particle diameter D (μm) and specific surface area S (m$^2$/g) of the potassium carbonate satisfy D/S≤600.

The potassium carbonate according to this aspect has the same configuration as that of the potassium carbonate described in the foregoing description of the method for producing an aromatic polyether of the present invention.

An aromatic polyether having a high molecular weight can be produced by using the potassium carbonate according to this aspect in a method comprising causing 4,4'-dichlorobenzophenone and hydroquinone to react with each other to produce an aromatic polyether.

EXAMPLES

Examples of the present invention are described below, but the present invention is not limited by these Examples.

The following items of each of Potassium Carbonates k1 to k5 to be used in Examples and Comparative Example below were measured.

(1) Bulk Density

The bulk densities of Potassium Carbonates k1 to k5 to be described later were measured by a method described below.

About 50 g of the potassium carbonate (mass: m (g)) weighed with an accuracy of 0.1 mass % was gently loaded into a 100-milliliter measuring cylinder (minimum scale unit: 1 ml), which had been dried, without being consolidated. The upper surface of a powder layer was carefully leveled without being consolidated, and the loose bulk volume Vo (ml) thereof was read to the minimum scale unit, followed by the calculation of the bulk density from the following equation.

$$\text{Bulk Density (g/ml)}=m/V_0$$

When the loose bulk volume Vo is more than 100 ml, the loose bulk volume Vo is adjusted to a volume of 100 ml or less by reducing the mass m of the potassium carbonate to be used as a sample, and the loose bulk volume Vo is read, followed by the calculation of the bulk density.

(2) Average Particle Diameter D

The average particle diameters D of Potassium Carbonates k1 to k4 to be described later were measured by a method described below.

Particle size distribution measurement was performed with CAMSIZER manufactured by MicrotracBEL Corp. by a dry method. The sample (potassium carbonate) was dropped into the measuring portion of the CAMSIZER with a vibrating feeder, and a picture of its particles was taken with a camera, followed by the measurement of their particle diameters. When an observed image was processed, the average particle diameter D was calculated through use of numerical values, which were obtained by processing data from the short diameters of the particle image, through automatic calculation by a program installed in the measuring apparatus.

(3) Specific Surface Area S

The specific surface areas S of Potassium Carbonates k1 to k4 to be described later were measured by a method described below.

(i) Pretreatment

As the pretreatment of the sample (potassium carbonate), heat-vacuum evacuation was performed with BELPREP vacll manufactured by MicrotracBEL Corp. at 100° C. for 1 hour or more. When a degree of vacuum of 10 Pa (75 mTorr) was achieved, the pretreatment was judged to be completed.

(ii) Measurement

Specific surface area measurement was performed with BELSORP-minill manufactured by MicrotracBEL Corp. by a nitrogen adsorption method at liquid nitrogen temperature. A nitrogen introduction amount was set in the "easy mode" of the apparatus, and a target relative pressure was set to 0.10, 0.15, 0.20, 0.25, or 0.30.

(iii) Analysis

BEL Master was used as analysis software. An analysis method was in conformity with JIS Z 8830:2013, and the specific surface area S was calculated through use of four or more measurement results at higher relative pressures by a BET multipoint method.

Example 1

Synthesis of Aromatic Polyether A-1

4,4'-Dichlorobenzophenone and hydroquinone were caused to react with each other to provide an aromatic polyetherA-1. Specifically, the polyether was synthesized by the following method.

41.203 g (0.164 mol) of 4,4'-dichlorobenzophenone, 17.804 g (0.162 mol) of hydroquinone, 25.707 g (0.186 mol) of Potassium Carbonate k1 (manufactured by FUJIFILM Wako Pure Chemical Corporation, fine powder), and 140.0 g of diphenyl sulfone were loaded into a 300-milliliter four-necked flask comprising a stirring machine, a temperature gauge, a nitrogen-introducing tube, a cooling tube, and a water recovery vessel connected thereto, and a nitrogen gas was flowed therein.

After the temperature of the mixture had been increased to 150° C., the temperature was increased to 200° C. over 30 minutes, and was held at the value for 60 minutes. Next, the temperature was increased to 250° C. over 30 minutes, and was held at the value for 60 minutes. Further, the temperature was increased to 300° C. over 30 minutes, and was held at the value for 2 hours.

After the completion of the reaction, the product was pulverized with a blender (7010HS manufactured by Waring), and was washed with acetone and water in the stated order, followed by drying with a dryer at 180° C. Thus, a powdery aromatic polyether A-1 was obtained.

Example 2

Synthesis of Aromatic Polyether A-2

An aromatic polyether A-2 was obtained in the same manner as in Example 1 except that 25.700 g (0.186 mol) of Potassium Carbonate k2 (manufactured by Wako Pure Chemical Industries, Ltd., special grade chemical) was used instead of Potassium Carbonate k1.

Example 3

Synthesis of Aromatic Polyether A-3

An aromatic polyether A-3 was obtained in the same manner as in Example 1 except that 25.708 g (0.186 mol) of Potassium Carbonate k3 (manufactured by Takasugi Pharmaceutical Co., Ltd., special grade chemical) was used instead of Potassium Carbonate k1.

Example 4

Synthesis of Aromatic Polyether A-4

An aromatic polyether A-4 was obtained in the same manner as in Example 1 except that 25.6798 g (0.168 mol) of Potassium Carbonate k4 (jet mill-pulverized product) was used instead of Potassium Carbonate k1.

Potassium Carbonate k4 (jet mill-pulverized product) was obtained as described below.

First, potassium carbonate (manufactured by FUJIFILM Wako Pure Chemical Corporation, special grade chemical) was pulverized with a mortar in a glove box filled with nitrogen, and was then sieved with a mesh having an aperture of 500 µm to provide a coarsely pulverized product as a passing material. Subsequently, the coarsely pulverized product was pulverized with a jet mill (manufactured by Aishin Nano Technologies Co., Ltd., NANO JETMIZER NJ-50-C) placed in the glove box under the conditions of a main pressure of 2 MPa and a throughput of 120 g/h to provide the jet mill-pulverized product.

Comparative Example 1

Synthesis of Aromatic Polyether A-5

An aromatic polyether A-5 was obtained in the same manner as in Example 1 except that 25.4300 g (0.184 mol) of Potassium Carbonate k5 (manufactured by Yee Fong Chemical & Industrial Co., Ltd.) was used instead of Potassium Carbonate k1.

Evaluation Method (1) Melt Flow Index

The melt flow index of the aromatic polyether obtained in each of Examples and Comparative Example was measured with a melt indexer (L-227) manufactured by Tateyama Kagaku High-Technologies Co., Ltd. in conformity with ASTM D 1238-13 at a resin temperature of 380° C. and a load of 2.16 kg.

(2) Reduced Viscosity $\eta_{sp}/c$

The reduced viscosity $\eta_{sp}/c$ of a solution, which was obtained by dissolving the aromatic polyether in concentrated sulfuric acid (purity: 95 mass % or more) so that its concentration became 0.1 g/dl, was measured at 25° C. with an Ubbelohde viscometer in conformity with JIS K 7367-5:2000.

The foregoing results are shown in Table 1.

TABLE 1

| | | Example 1 | Example 2 | Example 3 | Example 4 | Comparative Example 1 |
|---|---|---|---|---|---|---|
| Aromatic polyether | | A-1 | A-2 | A-3 | A-4 | A-5 |
| Potassium carbonate | | k1 | k2 | k3 | k4 | k5 |
| Properties of | Bulk density [g/ml] | 0.567 | 0.899 | 0.925 | 0.228 | 1.356 |

TABLE 1-continued

| | | Example 1 | Example 2 | Example 3 | Example 4 | Comparative Example 1 |
|---|---|---|---|---|---|---|
| potassium carbonate | Average particle diameter D [μm] | <150 | 460 | 600 | <50 | 590 |
| | Specific surface area S [m$^2$/g] | 0.71 | 1.51 | 1.63 | 4.22 | 0.46 |
| | D/S | <211 | 305 | 368 | <12 | 1283 |
| Melt flow index [g/10 min] | | 6.8 | 34 | 16 | 1.8 | 1360 |
| Reduced viscosity $\eta_{sp/C}$ [dl/g] | | 0.69 | 0.59 | 0.67 | 0.77 | 0.30 |

<Evaluation>

It is understood from Table 1 that the method for producing an aromatic polyether according to the present invention provides an aromatic polyether that is reduced in melt flow index (MI), and hence has a high molecular weight.

Some embodiments and/or Examples of the present invention are described in detail above, but a person skilled in the art could easily make various modifications to these illustrative embodiments and/or Examples without substantially departing from the novel teachings and effects of the present invention. Accordingly, those various modifications are encompassed in the scope of the present invention.

The invention claimed is:

1. A method for producing an aromatic polyether, comprising reacting 4,4'-dichlorobenzophenone and hydroquinone in the presence of a potassium carbonate satisfying the following conditions (A) and (B):
    (A) the potassium carbonate has a bulk density of 1.2 g/ml or less; and
    (B) an average particle diameter D (m) and a specific surface area S (m$^2$/g) of the potassium carbonate satisfy D/S≤600, wherein the potassium carbonate is the only alkali metal salt used in the reaction, and a combined concentration of 4,4'-dichlorobenzophenone and hydroquinone in a solvent is 1.5 mol/l to 4.0 mol/l.

2. The method for producing an aromatic polyether according to claim 1, comprising reacting 4,4'-dichlorobenzophenone and hydroquinone under a condition in which none of sodium fluoride, potassium fluoride, rubidium fluoride and cesium fluoride are present.

3. The method for producing an aromatic polyether according to claim 1, wherein the aromatic polyether to be produced has a melt flow index of 100 g/10 min or less.

4. The method for producing an aromatic polyether according to claim 1, comprising reacting 4,4'-dichlorobenzophenone and hydroquinone in diphenyl sulfone.

5. The method for producing an aromatic polyether according to claim 1, wherein the potassium carbonate satisfies D/S≤221.

6. The method for producing an aromatic polyether according to claim 1, wherein said reacting is performed in a reaction mixture consisting of 4,4'-dichlorobenzophenone, hydroquinone, the potassium carbonate and the solvent.

* * * * *